F. YOKEL.
COMBINED LAMP AND MIRROR FIXTURE FOR AUTOMOBILES.
APPLICATION FILED NOV. 2, 1916.
1,276,850.
Patented Aug. 27, 1918.
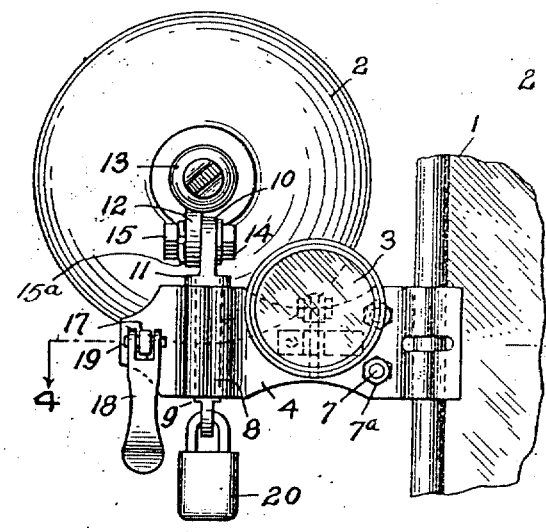
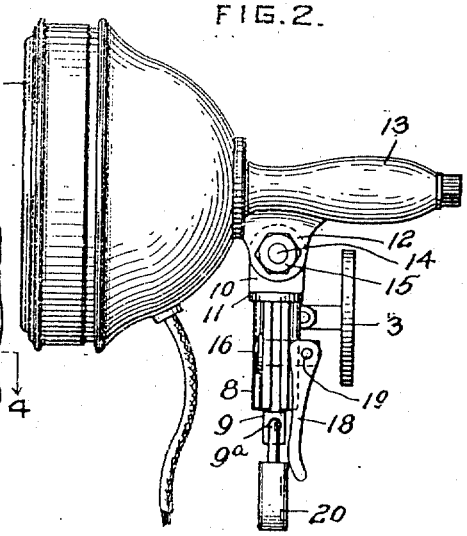
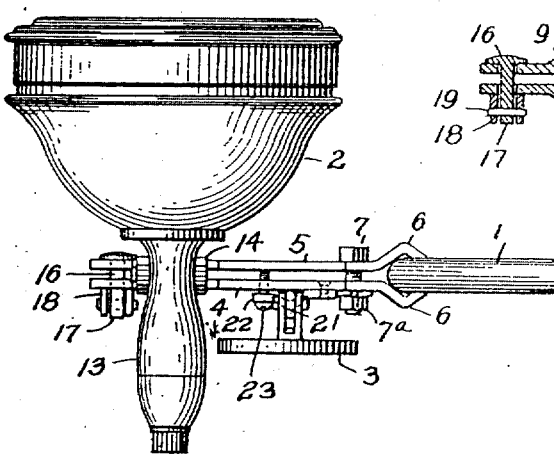
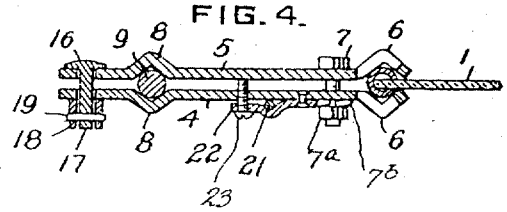
WITNESSES
J. Herbert Bradley.
Lois Wineman
INVENTOR
Frank Yokel
by W. G. Doolittle
Attorney

UNITED STATES PATENT OFFICE.

FRANK YOKEL, OF PITTSBURGH, PENNSYLVANIA, ASSIGNOR TO PITTSBURGH LAMP, BRASS & GLASS COMPANY, OF PITTSBURGH, PENNSYLVANIA, A CORPORATION OF NEW JERSEY.

COMBINED LAMP AND MIRROR FIXTURE FOR AUTOMOBILES.

1,276,850.  Specification of Letters Patent.  Patented Aug. 27, 1918.

Application filed November 2, 1916. Serial No. 129,117.

*To all whom it may concern:*

Be it known that I, FRANK YOKEL, a citizen of the United States, residing at Pittsburgh, in the county of Allegheny and State of Pennsylvania, have invented certain new and useful Improvements in Combined Lamp and Mirror Fixtures for Automobiles, of which the following is a specification.

The prime object of my invention is to provide a new and improved combined lamp and mirror fixture for automobiles.

The present invention is particularly designed for use in connection with what is known in the trade as electric "spot lamps", the combined lamp and mirror fixture being designed to be secured to the frame of an automobile wind shield within the line of vision of the driver.

In the accompanying drawing which illustrates an application of my invention,

Figure 1 is a rear elevational view showing a portion of a wind shield of an automobile with my invention applied thereto.

Fig. 2 is an elevational view taken at right angles to the view of Fig. 1.

Fig. 3 is a top plan view.

Fig. 4 is a sectional detailed view taken on line 4—4 of Fig. 1.

Referring to the drawing, 1 designates a portion of an automobile wind shield of the usual construction to which my invention is designed to be applied, 2 an electric lamp, and 3 a mirror. The lamp and mirror are designed to be carried on the combined lamp and mirror fixture, the latter in turn being securely attached to the framework of the wind shield.

As illustrated and preferred, the fixture comprises a bracket including two complemental spring metal clamping members 4 and 5, each member being provided with inner engaging ends 6 designed to engage a portion of the frame of the wind shield. These members are secured together by means of bolts 7 and nuts 7ᵃ, the former being passed through said members near the inner ends thereof. 7ᵇ designates split or spring washers mounted on the bolt. Each of the members 4 and 5 is formed with a bulged portion 8, said portions being designed, when the members are assembled, to form a socket for a vertically extending post or pin 9 on which the lamp is adjustably mounted. As shown, the upper portion of this pin is formed with an apertured head 10 and a collar 11, the latter being designed to be seated on a portion of the upper edges of members 4 and 5.

The lamp structure is provided with a projecting apertured lug 12, and a centrally disposed outwardly extending handle 13. In assembling the parts, the aperture of the lug 12 is brought into alinement with the aperture of the head of the post 9 and a bolt 14 passed through said apertures, thereby pivotally securing the lamp to the head of the post. The bolt 14 is provided with an adjusting nut 15 and a spring washer 15ᵃ.

A characteristic feature of the present invention resides in the quick acting locking and releasing means whereby the lamp may be removed bodily from the fixture and applied thereto with the least amount of trouble and without disturbing the position of the mirror carried on the fixture. These means, as illustrated, include a headed member or bolt 16 having a flat apertured shank portion 17, the shank portion being passed through openings formed in clamp members 4 and 5, and an eccentric lever element 18 pivotally secured to portion 17 of the bolt by a pin 19.

From the drawing, it will be understood that when the eccentric lever arm is down in the position shown by Fig. 2, the outer ends of the clamp members will be brought together in such a manner as to maintain the pin 9 within the socket and prevent a removal of the lamp. Raising the lever separates the clamps sufficiently to enable the vertically extending pin to be withdrawn.

If desired, the lower end of the vertically extending pin 9 may be provided with an opening 9ᵃ adapted to receive a padlock 20, thereby preventing the lamp structure from being removed without first unlocking the padlock.

The mirror is mounted on the fixture with a universal joint connection enabling it to be shifted to various positions relative to the fixture. As shown, the mirror is pivotally supported on one end of a vertically extending rod or pin 21, and this rod is secured to the fixture intermediate of its ends and out of line or to the rear of the lamp supporting means by a spring plate member 22, said plate at one end being riveted to member 4, and its other end being adjustably secured thereto by a screw 23.

The fixture as well as the back of the lamp structure has an exterior finish of a black or neutral color to form a dark or neutral background for the mirror when the parts are assembled.

The screw 23 employed for adjustably securing the plate member 22 to one of the clamping members of the bracket is designed to project through said member and bear against the other clamping member of the bracket, thereby limiting the closing movements of the outer ends of said complemental clamping members when the inner ends of said members are brought toward each other by means of the bolts and nuts 7 and 7ª. By this construction, the outer ends of the bracket members or those portions thereof forming the socket are prevented from being brought too close together to receive the post supporting the lamp.

What I claim is:—

1. A fixture unit of the character described and in combination, a bracket adapted to be removably secured to the frame of an automobile wind-shield within the line of vision of the driver, a mirror, and means for supporting it on and intermediate the ends of the bracket with a universal movement, a lamp and independent means for removably and adjustably supporting it on the bracket beyond the mirror, whereby the lamp may be applied to and bodily removed from the bracket without disturbing the mirror.

2. A fixture unit of the character described and in combination, a bracket adapted to be removably secured to an end of an automobile wind shield within the line of vision of the driver, a mirror and means for supporting it on and intermediate the ends of the bracket with a universal movement, a lamp structure removably and adjustably supported on the bracket beyond the mirror, said structure having a handle to permit rapid beam-directing movements of the lamp structure, and independent means for securing the lamp to the bracket and permitting a bodily removal thereof without disturbing the position of the mirror.

3. A fixture unit of the character described and in combination, a bracket structure including two complemental members adapted to be secured to an automobile wind shield, means adjacent the wind shield connecting the members and securing the bracket to the wind shield, a lamp structure including a supporting post mounted on the bracket, and quick-acting means coacting with the bracket members for locking and releasing the lamp structure while the bracket structure is positioned on the wind shield.

4. A fixture unit of the character described and in combination, a bracket structure including two complemental members adapted to be secured to an automobile wind shield, means connecting the members and securing the bracket to the wind shield, a lamp structure including a supporting post mounted on the bracket, and quick-acting means including an eccentric lever coöperating with the bracket members to lock and release the post of the lamp structure while the bracket structure is positioned on the wind shield, said locking means disposed beyond the lamp supporting post.

5. A fixture unit of the character described and in combination, a bracket structure including two complemental spring plate clamping members adapted to be secured to an automobile wind shield, a lamp structure including a supporting post mounted on the bracket, said post having an aperture near its lower end to receive a locking means, and quick-acting means coacting with the bracket members for locking and releasing the lamp structure.

6. A fixture unit of the character described and in combination, a bracket structure including two spring plate members adapted to be secured to an automobile wind shield within the line of vision of the driver, a mirror and means for supporting it on and intermediate the ends of the bracket with a universal movement, said supporting means including a plate member and an adjusting screw, said adjusting screw being passed through one of the bracket members and bearing against the other bracket member, a lamp and means for removably and adjustably supporting it on the bracket beyond the mirror.

In testimony whereof I affix my signature in presence of two witnesses.

FRANK YOKEL.

Witnesses:
LOIS WINEMAN,
ALICE B. DICE.